UNITED STATES PATENT OFFICE 2,506,441

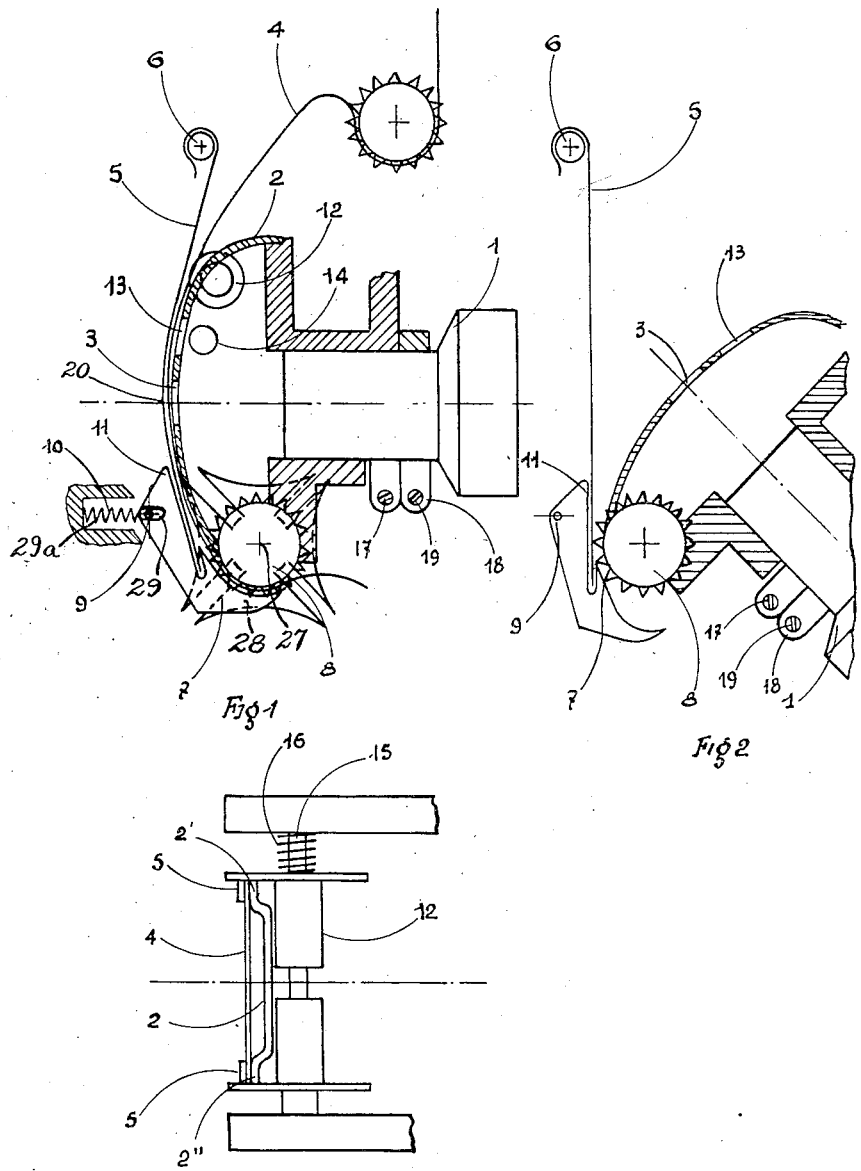

CINEMATOGRAPHIC PROJECTOR HAVING CURVED FILM GATE

André Marie Bernard Charlin, Montrouge, France

Application September 17, 1945, Serial No. 616,880
In France April 10, 1945

12 Claims. (Cl. 88—18.3)

In cinematographic projection apparatuses, the curved slide presents the advantage over the straight slide on ensuring a better behaviour of the film in front of the projection window by preventing the film from cockling under the action of the heat or of the ventilator in a more or less irregular manner, which has the effect of entailing variations in the focussing of the lens and of causing blurring of the picture thrown on the screen.

Nevertheless, up to the present the manufacture of a curved slide presented difficulties which complicated very much their construction and did not permit of obtaining a perfect guiding of the film.

The object of the present invention is the provision of a curved guiding slide for the film of very simple construction which guides the film with great regularity and which permits of carrying out any change of film by a very simple manoeuvre.

Another object of the invention is to provide a curved guiding slide mounted on a block integral with the lens and cooperating with means for holding the edges of the film against said slide, the unit comprising the curved slide, its support block and the lens being able to be moved away from said holding means by a pivoting action.

Still another object of the invention is to provide a guiding member pressing the film onto the drum of a Maltese cross member which is disengaged from contact with said drum by said holding means when said assembly is pivoted out of its projection position in view to change a film.

A further object of the invention is to provide such a curved slide so that it may follow the film from top to bottom of its travel as far as round the Maltese cross member, in order to avoid the film making a noise owing to vibrations due to the whisking of the Maltese cross member.

Still a further object of the invention is to provide in such a curved guiding slide means by which when the operator adjusts the film on it, said film is automatically framed on the projection window when the slide is returned to the projection position.

Another object of the invention is to provide in such a curved guiding slide device means by which when the operator dismounts the lens from the lens-carrier he can put it back in position with correct focussing.

A form of embodiment of the projector slide for cinematograph films according to the invention is shown, as an example, in the attached drawing.

Figure 1 is a cross section of a projection lens fitted with the film-guide slide in the projection position.

Figure 2 is a view similar to Figure 1 showing the assembly of the lens and slide moved away by pivoting for the introduction of the film when charging.

Figure 3 is a cross section of the film guiding slide and of a holding roller.

According to certain features of the invention, and as described in greater detail hereinafter, there is provided in a cinematographic projection apparatus a cylindrical feed member or drum serving for the intermittent advancement of a film, for example, by having secured thereto a Maltese cross member forming part of one of a group of well-known intermittent movements sometimes referred to as Geneva motion. The film advances along the curved rear surface of a film-guiding slide which is preferably rigidly secured to a lens-supporting block and a projection lens mounted in said block at the front of the apparatus. The curved surface of the slide terminates adjacent and tangentially to the cylindrical feed member about the axis of which the slide is pivotable in order to permit its withdrawal from suitable pressure means, such as a pair of steel strips, provided for the purpose of holding the film against the slide; such pivotal movement will therefore facilitate the insertion of a film between said slide and said pressure means without, at the same time, disturbing the tangential relationship between the slide and the drum.

I indicates the lens projecting the film onto the screen, 2 is a part which may with advantage be made of pressed sheet metal and which constitutes the curved slide. The radius of the curve of said slide is selected so as to combine correctly with the field curve of lens I, so that the image projected through the small opening drilled in the slide at point 3 may be sharp at all its points on the screen.

In order to avoid the picture rubbing on the whole of its surface against the slide, raised edges 2', 2'', stamped in the sheet metal on the sides of said slide, act so that the film bears only on its sliding margins.

Two steel strips 5 press film 4 against the curved slide. Said steel strips 5 are hung by their upper bent round end on a support 6 which at the same time determines their correct spacing by slots provided in the support.

The steel strips lose contact with the film a little before the bottom of the slide and are engaged by their ends in a slot provided in a part or shoe 7, the purpose of which is to press the film onto the drum 8 of the Maltese cross member 28, said drum being mounted on a spindle indicated at 27. Said shoes are articulated at 9 about a small spindle which can move in the direction of the band, due to an oblong shaped bearing 29 which allows it a certain liberty of movement in that direction in which it is pushed by a spring 10, anchored at 29a which bears against the spindle.

Moreover, the shoe bears, through a heel 11, against the steel strips 5 substantially at the spot where they lose contact with the film. The whole assembly of the lens, its support and curved slide 2 constitute a single block capable of pivoting about the spindle 27 of Maltese cross member 28 by an angle sufficient to be able to disengage the surface of the curved slide from the steel strips in order to introduce film 4 at the time of charging. In this movement which is related to the axis 20 of the lens, the steel strips 5 straighten out, as shown in Figure 2, the effect of which is to cause the rocking of shoe 7 and to disengage it from contact with the drum 8 of the Maltese cross; this permits the introduction of the film and its attachment on the drum of the Maltese cross.

When the rocking device is returned to its position, the steel strips 5 resume their position pressing film 4 against slide 2 and the slide, acting through the steel strips on heel 11, brings shoe 7 back into contact with drum 8.

It is of advantage to constitute curved slide 2 in such a manner that it may follow the film from top to bottom of its travel even as far as round the Maltese cross member in order to avoid the film making a noise owing to the vibrations due to the whisking of the Maltese cross member. It will be noted that pivotal movement of the slide 2 about the axis 27 will result in a relative movement between the drum 8 (which engages the film) and the lower portion of the slide, whereby "jamming" will be prevented and the film detached from the surface of slide 2 without the aid of special stripper means.

The curved slide does not comprise a side for guiding the film laterally, but merely a roller 12 placed at the head of the slide on a spindle 15; a spring 16 slipped over spindle 15 pushes roller 12 which guides the film.

At the time of charging of the device described, the centring of the image is not the same when the curved slide is tilted in the charging position or returned to the projection position.

To permit of adjusting the film, a centring window 13 placed above projection window 3 is provided in the slide; a small lamp 14 placed behind said window is lighted at the moment of charging.

Window 13 is arranged in such a manner that when the operator adjusts his film on it, it is automatically centred on the projection window 3 when the slide is returned to the projection position.

The arrangement of the invention is of a very great simplicity of manufacture. Moreover, steel strips 5 are easily interchangeable, which permits of replacing them according to the state of the films. For new films, said strips may be constituted by strips of thin steel, covered with velvet, felt or skin, while for worn and spoilt films they may be constituted by slightly thicker steel strips, chromium plated and highly polished.

The advantage of the curved slide mounted in the form described is that the focussing is strictly fixed whatever the film cast on the screen may be. Under these conditions it is possible to suppress the adjustment of the lens. In Figure 1 it will be noticed that the lens is definitely locked, after its correct adjustment with the help of a part forming a clamping collar milled in the lens-carrier and locked by screw 17.

Nevertheless, it may be feared that in the course of the cleaning of the rear pupil of the lens, the operator may not be capable of effecting a correct adjustment of the focussing, which would become lost owing to the dismounting of the lens. To avoid this disadvantage, a collar 18 capable of being tightened by a screw 19 slides along the body of the lens. When the final focussing is effected and screw 17 of the lens carrier is locked, this ring is pushed until it makes contact with the front end of the lens-carrier and its screw is locked. Under these conditions, if the operator dismounts the lens from the lens carrier he can put it back in position until it comes and abuts against collar 18 and he is certain to find at this precise spot the correct focus.

Various modifications may moreover be made to the example of embodiment described without departing from the scope of the appended claims.

I claim:

1. In a cinematographic projection apparatus, in combination, a lens, a supporting block for said lens, a curved channel-shaped slide adjacent said block, said slide being adapted to guide a film past said lens, said lens, block and slide constituting a rigid assembly, said slide having two raised edges, a Maltese cross drum, a spindle for said drum about which said assembly is pivotally mounted, supporting strips adapted to hold the edges of the film against the raised edges of said slide, a fixed support anchoring said strips at their upper ends, a member having a slit in which are freely engaged the lower ends of said strips, said member having a curved portion adapted to wrap the film around the Maltese cross drum and a heel adapted to push the film against the raised edges of said slide, and pivotal supporting means for said member.

2. In a cinematographic projection apparatus, the combination according to claim 1 including elastic means tending to push said pivotal supporting means in the direction of said slide.

3. In a cinematographic projection apparatus, the combination according to claim 1 including a rod, a pair of rollers journalled on said rod, at least one of said rollers being axially displaceable on said rod, and a spring coiled around said rod so as to tend to push the last-mentioned roller against the other roller, said rollers having lateral webs adapted to guide the film; said curved slide and said strips extending between said webs.

4. In a cinematographic projection apparatus, the combination according to claim 1 wherein said slide has a projection opening, further comprising a centering window provided in said slide in spaced relation to said opening, and a lamp behind said window.

5. In a cinematographic projection apparatus, the combination according to claim 1 wherein said block forms a socket for said lens, further comprising clamping means for tightening said socket around a complementary portion of said lens, and a collar slidably mounted on said complementary portion and adapted to be locked thereon to locate said lens at a predetermined distance from said slide.

6. In a cinematographic projection apparatus, in combination, an optical projection system, a cylindrical feed member for moving a film past said system, a film-guiding slide mounted pivotably about the axis of said member, said slide having a curved guiding surface which terminates adjacent and tangentially to said member and further having an opening in alignment with the axis of said optical system, a pair of resilient strips anchored at one end and adapted to assume the curvature of said guiding surface, at the same time pressing the edges of the film against said surface, when said slide is in an operative position, said strips losing contact with the film short of said member, a shoe having a curved portion and further having a slit which receives the other ends of said strips, and mounting means swingably supporting said shoe for movement of said shoe toward said member under the control of said strips upon deformation of the latter by contact with said guiding surface, said curved portion being adapted to wrap the film about said member upon movement of said shoe toward said member.

7. In a cinematographic projection apparatus, the combination according to claim 6 wherein said shoe has a heel portion adapted, upon the said movement of the shoe, to force against said surface a portion of the film substantially at the point where said strips lose contact with the film.

8. In a cinematographic projection apparatus, the combination according to claim 7 wherein said shoe is mounted for pivotal and translational displacement.

9. In a cinematographic projection apparatus, the combination according to claim 7 wherein said slide has two raised edges forming said guiding surface, further comprising anchor means for said strips having spaced notches arranged to maintain said strips in alignment with said edges, respectively.

10. In a cinematographic projection apparatus, in combination, an optical projecting system, a cylindrical feed member for moving a film past said system, a film-guiding slide mounted pivotably about the axis of said member, said slide having a guiding surface which terminates adjacent and tangentially to said member and further having an opening in alignment with the axis of said optical system, resilient pressure means arranged to force the film against said surface when said slide is in an operative position, said pressure means terminating short of said member and being yieldably engaged by said slide when the latter is in said operative position, a shoe mounted for displacement relative to said member, a spindle forming a pivot for said shoe, and elongated bearing means adapted to support said spindle for limited translational movement toward said member, said shoe being displaceable by said pressure means for movement toward said member when said pressure means is engaged by said slide, said shoe having a curved position adapted to wrap the film about said member when said slide is in said operative position.

11. In a cinematographic projection apparatus, the combination according to claim 10 including spring means acting upon said spindle so as to tend to displace the same toward said member.

12. In a cinematographic projection apparatus, in combination, a projection lens at the front of the apparatus, a supporting block for said lens, a slide secured to the rear of said block, and having an opening aligned with said lens, said slide, block and lens forming a rigid assembly, a cylindrical feed member for moving a film past said opening, said slide having a film-guiding rear surface terminating adjacent and tangentially to said member, a spindle for said member about which said assembly is mounted so as to be pivotable between an operative and an inoperative position, pressure means arranged to force the film against said surface when the assembly is in said operative position, said slide being curved and having spaced ridges representing the said guiding surface, said pressure means comprising a pair of resilient strips each aligned with a respective one of said ridges and adapted to be deflected thereby when said slide moves into operative position, and a shoe mounted for displacement relative to said member, said shoe having a slit freely engaging the ends of said strips in such a manner that said shoe will move toward said member when said slide in its operative position deflects said strips, said shoe having a curved portion adapted to wrap the film about said member when moving toward said member.

ANDRÉ MARIE BERNARD CHARLIN.

REFERENCES CITED

The following references are of record in the file of this patent:

UNITED STATES PATENTS

| Number | Name | Date |
|---|---|---|
| 1,165,146 | Wells | Dec. 21, 1915 |
| 1,551,037 | Lube | Aug. 25, 1925 |
| 1,828,768 | Dina | Oct. 27, 1931 |
| 1,872,353 | Schulz | Aug. 16, 1932 |
| 1,956,418 | Flinker | Apr. 14, 1934 |
| 2,032,184 | Schiffl | Feb. 25, 1936 |
| 2,092,177 | McClay | Sept. 7, 1937 |

FOREIGN PATENTS

| Number | Country | Date |
|---|---|---|
| 380,285 | Germany | Sept. 6, 1923 |

OTHER REFERENCES

Motion Picture Projectionist, November 1930, page 27.

Motion Picture Projectionist, December 1930, page 34.